US010779508B2

(12) United States Patent
Imaizumi et al.

(10) Patent No.: US 10,779,508 B2
(45) Date of Patent: Sep. 22, 2020

(54) WATER FEEDER FOR PETS AND FILTER THEREFOR

(71) Applicant: GEX CORPORATION, Osaka (JP)

(72) Inventors: Yasunori Imaizumi, Osaka (JP); Hiroyoshi Kusaka, Osaka (JP)

(73) Assignee: GEX CORPORATION, Osaka (JP)

( * ) Notice: Subject to any disclaimer, the term of this patent is extended or adjusted under 35 U.S.C. 154(b) by 205 days.

(21) Appl. No.: 16/084,320

(22) PCT Filed: Aug. 30, 2017

(86) PCT No.: PCT/JP2017/031147
§ 371 (c)(1),
(2) Date: Sep. 12, 2018

(87) PCT Pub. No.: WO2018/211718
PCT Pub. Date: Nov. 22, 2018

(65) Prior Publication Data
US 2019/0075755 A1 Mar. 14, 2019

(30) Foreign Application Priority Data
May 16, 2017 (JP) ................................. 2017-097521

(51) Int. Cl.
*A01K 7/00* (2006.01)
*A01K 7/02* (2006.01)
(Continued)

(52) U.S. Cl.
CPC ............... *A01K 7/025* (2013.01); *A01K 7/00* (2013.01); *A01K 39/02* (2013.01); *A01K 5/0114* (2013.01); *A01K 7/022* (2013.01)

(58) Field of Classification Search
CPC .......... A01K 7/00; A01K 7/025; A01K 7/005; A01K 7/06
(Continued)

(56) References Cited

U.S. PATENT DOCUMENTS 2,790,417 A * 4/1957 Brembeck .............. A01K 39/02
119/81
3,610,206 A * 10/1971 Davis ................... A01K 39/024
119/78
(Continued)

FOREIGN PATENT DOCUMENTS

JP 2014-97010 A 5/2014
JP 2014-97011 A 5/2014
(Continued)

OTHER PUBLICATIONS

International Search Report dated Nov. 28, 2017 issued in corresponding PCT/JP2017/031147 application (2 pages).
(Continued)

Primary Examiner — Richard T Price, Jr.
(74) Attorney, Agent, or Firm — Millen, White, Zelano & Branigan, P.C.; William Nixon (57) ABSTRACT

A water feeder filter water feeder includes a water storage tank and a water drinking portion. The filter supplies and returns water from the water storage tank to the water drinking portion. The filter is detachably provided between the water storage tank and the water drinking portion and passes the water from an upper surface side to a lower surface side of the filter. The filter includes a filter tray with a bottom wall having a water passing aperture and an outer peripheral wall. An internal filter medium is in the filter tray. A top covering filter medium covers an upper end opening of the filter tray. A partition wall of the filter tray is formed with a lower side is positioned inner than an upper side when viewed from each chamber. The outer peripheral wall is formed with a lower side is positioned inner than an upper side.

7 Claims, 11 Drawing Sheets

(51) Int. Cl.
*A01K 39/02* (2006.01)
*A01K 5/01* (2006.01)

(58) Field of Classification Search
USPC .................................. 119/72, 74–76, 78–80
See application file for complete search history.

(56) References Cited

U.S. PATENT DOCUMENTS

| | | | | |
|---|---|---|---|---|
| 4,426,956 | A | * | 1/1984 | McKinstry ............ G01F 13/006 |
| | | | | 119/72 |
| 5,036,800 | A | * | 8/1991 | Lischka ................... A01K 7/04 |
| | | | | 119/75 |
| 2012/0137979 | A1 | * | 6/2012 | Lipscomb ............... A01K 7/02 |
| | | | | 119/74 |
| 2012/0210942 | A1 | * | 8/2012 | Wacker ................... A01K 7/06 |
| | | | | 119/72 |
| 2013/0019809 | A1 | | 1/2013 | McCallum et al. |
| 2014/0076242 | A1 | * | 3/2014 | Ho ........................... A01K 7/04 |
| | | | | 119/74 |
| 2015/0189856 | A1 | * | 7/2015 | Alexander ............... A01K 7/02 |
| | | | | 119/74 |

FOREIGN PATENT DOCUMENTS

| | | |
|---|---|---|
| JP | 5819277 B2 | 11/2015 |
| JP | 2017-148018 A | 8/2017 |

OTHER PUBLICATIONS

YouTube [online]—Mar. 28, 2016—URL:https://www.youtube.com/watch?v=DnTd1_JwRt4.

* cited by examiner

WATER FEEDER FOR PETS AND FILTER THEREFOR

TECHNICAL FIELD

The present invention relates to a water feeder for pets for feeding drinking water to pets, such as, e.g., dogs and cats, and also relates to a filter for use in the water feeder for pets.

BACKGROUND ART

When feeding water to dogs or cats keeping as pets, it is common to place a container, such as, e.g., a bowl, in which water is filled, in a predetermined place so that pets can drink the water from the container at any time. However, with such a way of feeding water, the water in the bowl may sometimes be left for a long time, which is undesirable from the viewpoint of hygiene.

Under the circumstances, in recent years, a circulation type automatic water feeder (watering device) has been proposed in which water is supplied while being circulated automatically as shown in the following Patent Documents 1 and 2.

This circulation type automatic water feeder for pets is provided with a water storage tank for storing water, a filter provided above the water storage tank, and a water drinking portion provided above the filter. The water in the water storage tank is circulated such that the water in the water storage tank is pumped up to the water drinking portion with a circulation pump and returned to the water storage tank through the filter after flowing through the water drinking portion. In this way, the water is circulated so that the water flowing through the water drinking portion is fed to pets.

In a circulation type automatic water feeder as shown in the following Patent Documents 1 and 2, the filter is provided with a tray in which a number of water passing apertures are formed in the bottom wall, a filter medium accommodated in the tray, and a water-permeable covering material, such as a nonwoven fabric, attached so as to close the upper end opening of the tray. This filter is detachably attached to the upper part of the water storage tank so that the filter can be replaced with new one as necessary.

PRIOR ART

Patent Document

Patent Document 1: Japanese Unexamined Patent Application Publication No. 2014-97010
Patent Document 2: Japanese Unexamined Patent Application Publication No. 2014-97011

SUMMARY OF THE INVENTION

Problems to be Solved by the Invention

However, in the conventional circulation type automatic water feeder as shown in the aforementioned Patent Documents 1 and 2, for example, a part of the water flowing along the partition wall and the outer peripheral wall sometimes flows in directions other than the direction toward the center of each chamber. As described above, since the water flow direction is unstable, the water may sometimes not pass through the filter medium efficiently. This causes a problem that there is a possibility that sufficient filtration performance cannot be reliably obtained.

The present invention has been made in view of the aforementioned problems, and aims to provide a water feeder for pets capable of assuredly obtaining sufficient filtration performance and a filter therefor.

Means for Solving the Problems

In order to attain the aforementioned objects, the present invention has the following structures as the gist.

[1] A filter for a water feeder for pets, wherein the water feeder includes a water storage tank and a water drinking portion arranged above the water storage tank and is configured to supply water from the water storage tank to the water drinking portion and return the water to the water storage tank, and the filter is detachably provided between the water storage tank and the water drinking portion to pass the water returning from the water drinking portion to the water storage tank from an upper surface side of the filter to an lower surface side thereof, the filter comprising: a filter tray including a bottom wall having a water passing aperture formed therein, an outer peripheral wall provided at an outer peripheral edge portion of the bottom wall in a rising manner, an inner peripheral wall provided at an inner peripheral edge portion in a rising manner, and a plurality of partition walls partitioning a space between the outer peripheral wall and the inner peripheral wall into a plurality of internal filtration chambers in a circumferential direction, an internal filter medium accommodated in the filter tray, and a top covering filter medium attached so as to cover an upper end opening of the filter tray, wherein the outer peripheral wall of the filter tray is formed so that a lower side of the outer peripheral wall is positioned inner than an upper side thereof, and the partition wall of the filter tray is formed so that a lower side of the partition wall is positioned inner than an upper side thereof when viewed from each chamber.

[2] The filter for a water feeder for pets as recited in claim 1, wherein the partition wall of the filter tray is formed so as to be inclined downward toward an inside from an upper end of the partition wall to a lower end thereof when viewed from each chamber.

[3] The filter for a water feeder for pets as recited in claim 1 or 2, wherein the outer peripheral wall of the filter tray is formed so as to be inclined downward toward an inside from an upper end of the outer peripheral wall to a lower end thereof.

[4] The filter for a water feeder for pets as recited in any one of claims 1 to 3, wherein the partition wall of the filter tray is composed of two plates.

[5] The filter for a water feeder for pets as recited in any one of claims 1 to 3, wherein the filter is formed into a donut shape in a plan view.

[6] The filter for a water feeder for pets as recited in any one of claims 1 to 4, wherein the filter is formed in a semicircular arc shape in a plan view.

[7] A water feeder for pets, comprising: a water storage tank; a filter detachably provided above the water storage tank; and a water drinking portion provided above the filter, wherein the water feeder is configured to pass the water supplied from the water storage tank to the water drinking portion through the filter from an upper surface side of the filter to a lower surface side thereof to return to the water storage tank, the filter comprising: a filter tray including a bottom wall having a water passing aperture formed therein, an outer peripheral wall provided at an outer peripheral edge portion of the bottom wall in a rising manner, an inner peripheral wall provided at an inner peripheral edge portion in a rising manner, and a plurality of partition walls partitioning a space between the outer peripheral wall and the inner peripheral wall into a plurality of internal filtration chambers in a circumferential direction, an internal filter medium accommodated in the filter tray, and a top covering filter medium attached so as to cover an upper end opening of the filter tray, wherein the outer peripheral wall of the filter tray is formed so that a lower side of the outer peripheral wall is positioned inner than an upper side thereof, and the partition wall of the filter tray is formed so that a lower side of the partition wall is positioned inner than an upper side thereof when viewed from each chamber.

Effects of the Invention

According to the filter for a water feeder for pets according to the invention [1], the outer peripheral wall of the filter tray is formed so that the lower side of the outer peripheral wall is positioned inner than the upper side thereof, and the partition wall of the filter tray is formed so that the lower side of the partition wall is positioned inner than the upper side thereof as seen from each chamber. For this reason, the water flowing on the outer peripheral wall of the filter tray flows down toward the inner peripheral wall side along the outer peripheral wall, and the water flowing on the partition wall flows down along the partition wall toward the center of each chamber. In this way, since the water can be made to flow toward the center of each chamber, the water can pass through the internal filter medium efficiently, which enables to obtain sufficient filtration performance.

According to the filter for a water feeder for pets according to the invention [2], it is possible to flow the water flowing from the partition wall inward with a smooth and stead flow, which enables to assuredly flow the water toward the center of each chamber.

According to the filter for a water feeder for pets according to the invention [3], it is possible to flow the water flowing in from the outer peripheral wall inward with a smooth and stead flow, which enables to assuredly flow the water toward the center of each chamber.

According to the filter for a water feeder for pets according to the invention [4], the partition wall of the filter tray is composed of two plates, and therefore the material between the two plates can be reduced, which in turn can attain the weight reduction of the filter tray.

According to the filter for a water feeder for pets according to the invention [5] and [6], the aforementioned effects can be more reliably obtained.

According to the filter for a water feeder for pets according to the invention [7], the main part is the same as that of the invention [1], and therefore the same effects as described above can be obtained.

EMBODIMENTS FOR CARRYING OUT THE INVENTION

Figure 1:
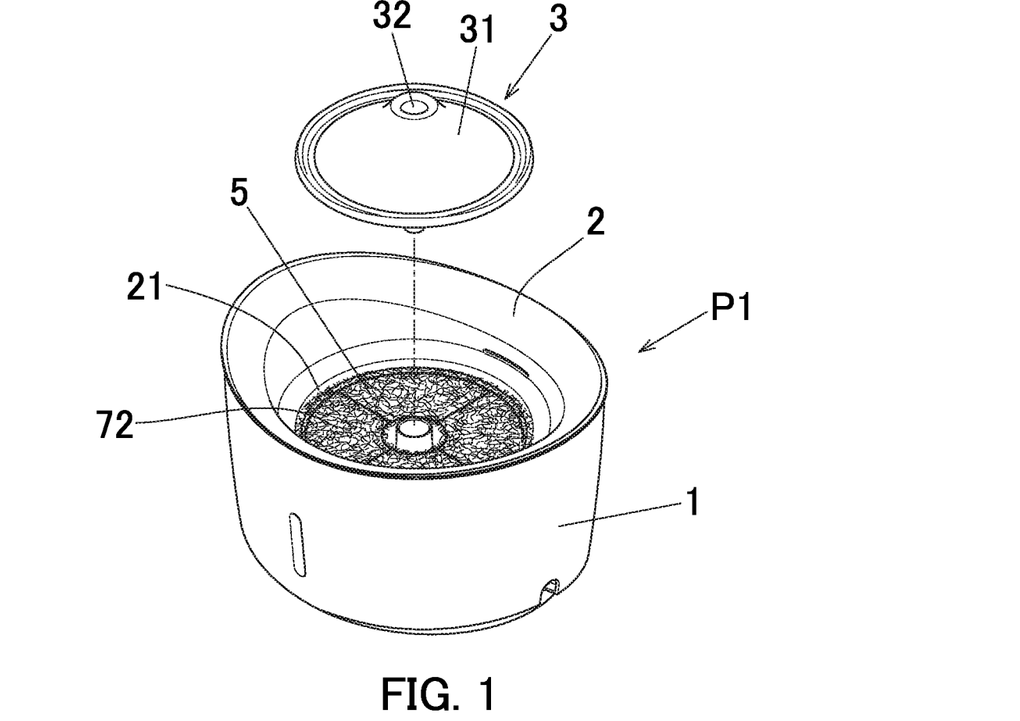
FIG. 1 is a perspective view showing a circulation type automatic water feeder for pets according to a first embodiment of the present invention in a state in which a top funnel is detached.
Figure 2:
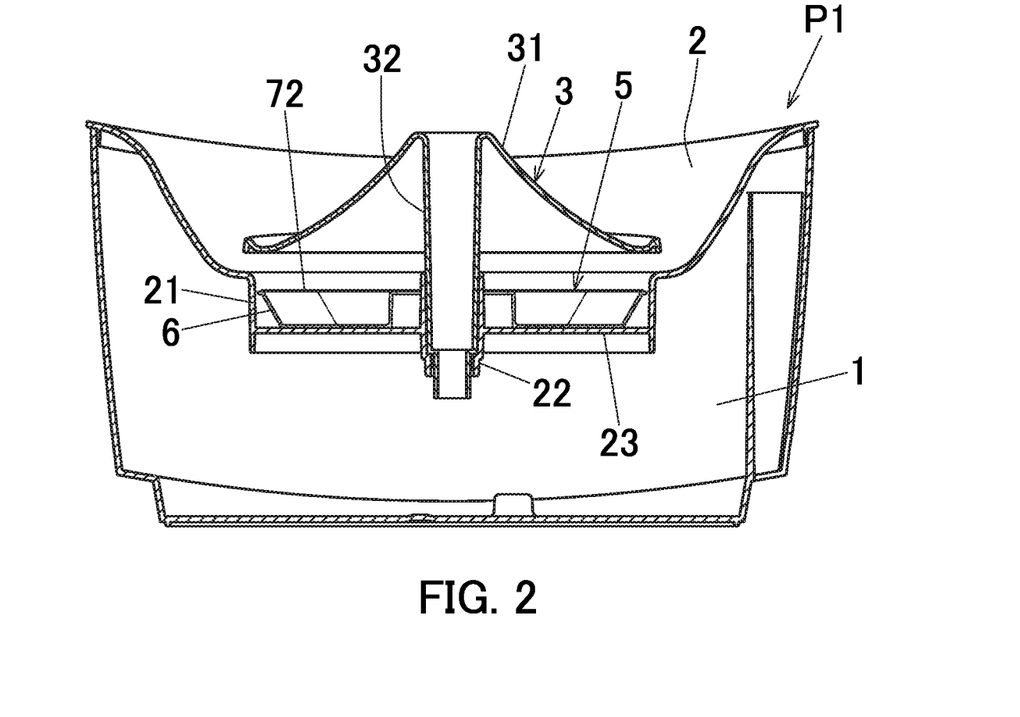
FIG. 2 is a front cross-sectional view showing the water feeder of the first embodiment.

FIG. 1 is a perspective view showing a circulation type automatic water feeder P1 for pets according to a first embodiment of the present invention in which a top funnel is separated. FIG. 2 is a front cross-sectional view showing the water feeder P1 of the first embodiment.

As shown in these figures, the circulation type automatic water feeder P1 for pets in the first embodiment is suitably used for pets, such as, e.g., dogs and cats. This circulation type automatic water feeder P1 for pets includes, as basic components, a water storage tank 1, a support frame 2, a top funnel 3, and a filter 5.

This water storage tank 1 is formed by a container that has watertightness so that drinking water for pets can be stored inside and has a top opening. The peripheral wall surrounding the circumference of the water storage tank 1 is formed in a substantially elliptical shape in horizontal cross-section, so that the upper end opening thereof is also formed in a substantially elliptical shape in a plan view.

The support frame 2 is detachably attached to the upper end opening of the water storage tank 1. The support frame 2 is formed in a substantially concave spherical shape or a substantially bowl shape, and has a filter installation recessed step portion 21 of a circular shape in a plan view formed in the center portion. In the bottom wall of this filter installation recessed step portion 21, a top funnel attaching cylindrical portion 22 is formed in the center portion and an opening 23 for passing water is formed outside the cylindrical portion 22 (see FIG. 2).

As shown in FIG. 1 and FIG. 2, the top funnel 3 is constituted by an integrally molded article made of a rigid synthetic resin including a water drinking portion 31 of a round shape in a plan view formed in an umbrella-like or mountain-like shape, and a water supply pipe 32 extending vertically downward from a central position on the lower surface side of the water drinking portion 31. The upper end of the water supply pipe 32 is open to the upper surface side of the water drinking portion 31.

The lower end portion of the water supply pipe 32 of the top funnel 3 is fixedly fitted in the top funnel attaching cylindrical portion 22 of the support frame 2 via the center hole 60 of the filter 5. As a result, the top funnel 3 is supported by the support frame 2 in a state in which the water drinking portion 31 is arranged so as to cover the filter 5 in the bowl-like support frame 2.

The top funnel 3 is mainly classified into a top funnel for cats and a top funnel for dogs. As described in the first embodiment, the top funnel 3 in which the water drinking portion 31 is formed in an umbrella-like shape or a mountain-like shape and has no portion to accumulate water is suitably used for cats. As shown in a second embodiment which will be described later, a top funnel in which a recess for accumulating water on the upper portion of the water drinking portion 31 is suitably used for dogs.

In the circulation type automatic water feeder P1 for pets of the first embodiment, a circulation pump (not shown) is accommodated in the water storage tank 1, and the discharge port of the circulation pump is connected to the lower end of the water supply pipe 32 of the top funnel 3.

The filter 5 is configured so that it can be mounted on the bottom wall of the filter installation recessed step portion 21 of the support frame 2. In such a mounted state, the filter 5 is formed to have a size capable of being accommodated in the filter installation recessed step portion 21.

As shown in FIG. 3 to FIG. 9, the filter 5 is composed of a filter tray 6, internal filter mediums 71, and a top covering filter medium 72.

Figure 3:
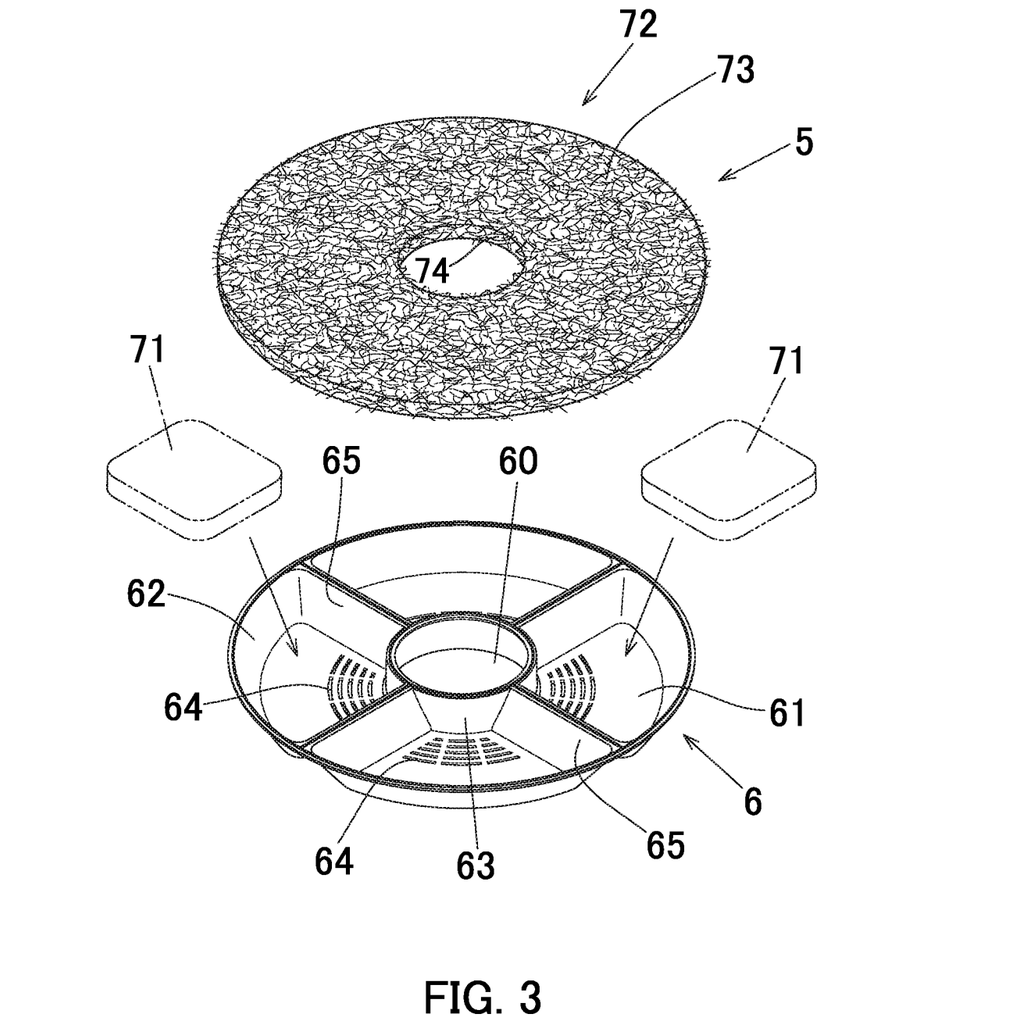
FIG. 3 is an exploded perspective view of a filter applied to the water feeder of the first embodiment.
Figure 4:
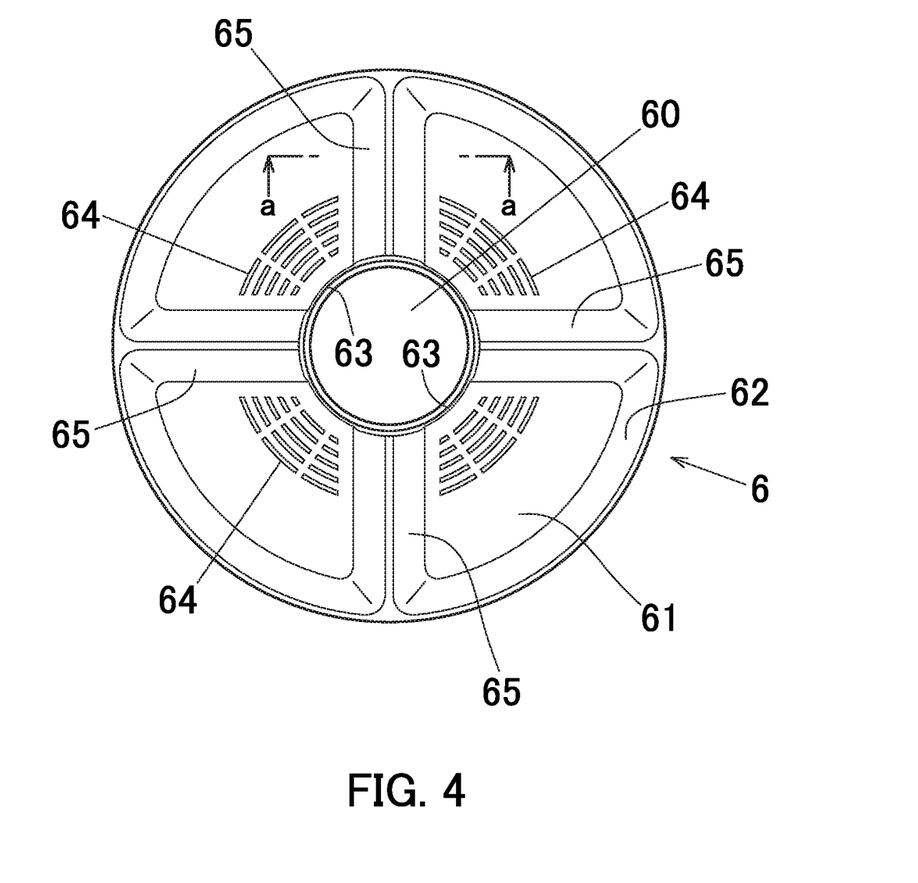
FIG. 4 is a plan view of a filter tray of the first embodiment.
Figure 5:
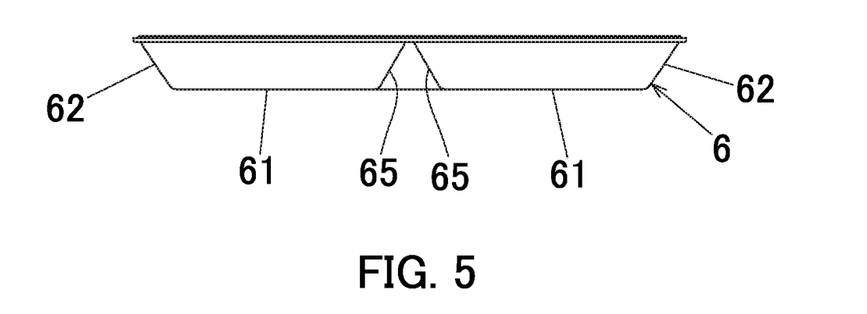
FIG. 5 is a side view of the filter tray of the first embodiment.

The filter tray 6 is formed in a donut shape in a plan view in which a circular center hole 60 is formed in the center. The filter tray 6 includes a bottom wall 61, and an outer peripheral wall 62 is formed continuously in a circumferential direction in a rising shape at an outer peripheral edge portion on the upper surface side of the bottom wall 61.

In the bottom wall 61, a number of water passing apertures 64 elongated in the circumferential direction are formed in the circumferentially and radially aligned manner. These water passing apertures 64 are formed in the vicinity of the inner peripheral wall 63.

Figure 6:
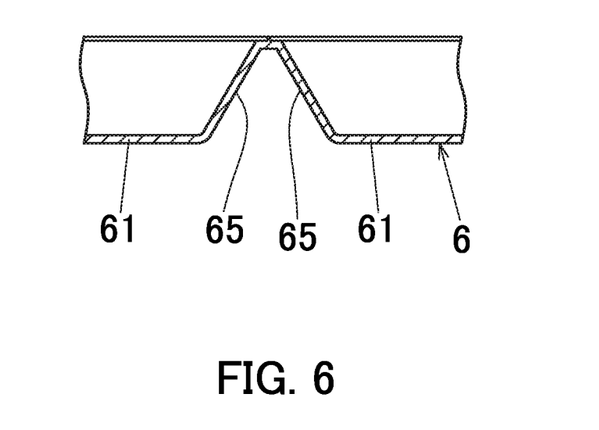
FIG. 6 is a cross-sectional view of the filter tray of the first embodiment taken along the line a-a.
Figure 7:
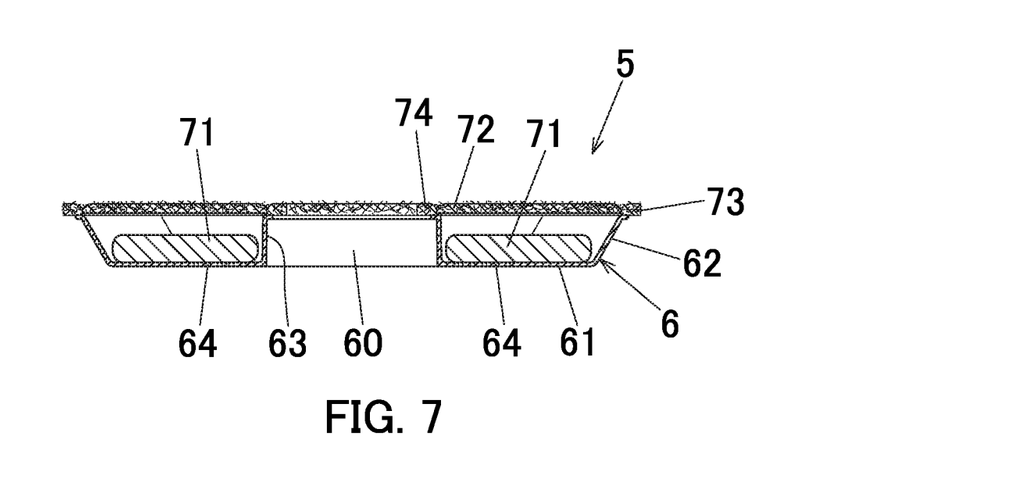
FIG. 7 is a cross-sectional view of the filter of the first embodiment.

In the first embodiment, the outer peripheral wall 62 is formed so as to be positioned gradually inward from the upper side to the lower side and is formed of an inclined wall downwardly inclined toward the inner side. The outer peripheral wall 62 has a constant gradient in almost the entire region from the upper end to the lower end, and the cross-section is formed linearly.

On the upper surface side of the bottom wall 61, four partition walls 65 for partitioning the upper surface side into four internal filtration chambers along the circumferential direction are formed in a rising manner. This partition wall 65 is composed of two plate materials. As viewed from each chamber, the partition wall 65 is formed so as to be gradually positioned inward from the upper side to the lower side and is formed of an inclined wall downwardly inclined toward the inner side.

The partition wall 65 has an outer edge connected to the outer peripheral wall 62 and an inner end edge connected to the inner peripheral wall 63 of the center hole 60. In addition, the inner edge of the partition wall 65 is arranged along the radial direction so as to be disposed at a position spaced apart in the outer diameter direction from the peripheral portion of the center hole 60 (in the vicinity of the peripheral portion of the center hole 60).

The filter tray 6 is constituted by, for example, an integrally molded article of a hard synthetic resin, and the bottom wall 61, the outer peripheral wall 62, the inner peripheral wall 63, and the partition walls 65 are integrally formed with each other. The upper end faces of the outer peripheral wall 62, the inner peripheral wall 63, and the partition wall 65 in the filter tray 6 are configured so as to be arranged on the same plane.

In the filter tray 6, an internal filter medium 71 is accommodated in each of the internal filtration chambers partitioned by the partition walls 65. As the internal filter medium 71, an adsorption filter medium, such as, e.g., activated carbon, is used. In this embodiment, an activated carbon bag in which activated carbon or the like is packed is adopted as the internal filter medium 71.

A top covering filter medium 72 of a donut-shape in a plan view is attached to the upper opening of the filter tray 6 of a donut-shape in a plan view so as to cover the top opening. In this embodiment, as the top covering filter medium 72, a physical filter medium, such as, e.g., a nonwoven fabric, is used. The top covering filter medium 72 made of this nonwoven fabric is welded to given portions of the upper end face of the outer peripheral wall 62, the inner peripheral wall 63, and the partition walls 65 of the filter tray 6 so as to cover the entire area of the upper opening of the filter tray 6.

As shown in FIGS. 1 and 2, the filter 5 configured as described above is placed on the bottom wall of the filter installation recessed step portion 21 of the support frame 2 provided in the water storage tank 1, and is accommodated in the recessed step portion 21 in a fitted manner. In this accommodated state, the center hole 60 of the filter 5 is arranged corresponding to the top funnel attaching cylindrical portion 22 provided at the center of the bottom wall of the support frame 2.

The circulation type automatic water feeder P1 for pets of the first embodiment is configured as described above. When the aforementioned circulation pump is driven in a state in which a predetermined amount of water for pet drinking water is stored in the water storage tank 1, the water in the water storage tank 1 is ejected to the water supply pipe 32 of the top funnel 3 by the circulation pump. Thus, the water flows upward through the water supply pipe 32 and is discharged from the upper end opening of the water supply pipe 32 to the upper surface side of the water drinking portion 31. The discharged water flows down along the water drinking portion 31 due to its own weight while diffusing in the outer circumferential direction, and flows out to the outside from the outer peripheral edge portion of the water drinking portion 31 and falls downward. The water flowing out of the water drinking portion 31 passes through the top covering filter medium 72 of the filter 5 from the top to the bottom to be introduced into the filter tray 6. After passing through the internal filter medium 71, the water flows downward through the water passing apertures 64 of the bottom wall 61. Thus, the water flows out of the filter 5 downward, and returns to the inside of the water storage tank 1.

In this manner, water is circulated between the water storage tank 1 and the water drinking portion 31, so that the water flowing through the top covering filter medium 72 is fed to pets, such as, e.g., dogs and cats, as drinking water.

With such circulation of water, from the water passing through the filter 5, food remains and/or a coat of pets, dust, and/or waste are filtered with the top covering filter medium 72 made of a nonwoven fabric. While, unpleasant odors, such as chlorine odors, are adsorbed in and removed by the internal filter medium 71 made of activated carbon. Thus, the circulating water is filtered and purified to maintain good water quality as drinking water.

In the circulation type automatic water feeder P1 for pets according to the first embodiment, when the filter 5 is replaced with a new one, after removing the top funnel 3 to expose the filter 5, the filter 5 is taken out from the filter installation recessed step portion 21 of the support frame 2, and a new filter 5 is accommodated in the recessed step portion 21 and the top funnel 3 is attached.

Figure 8:
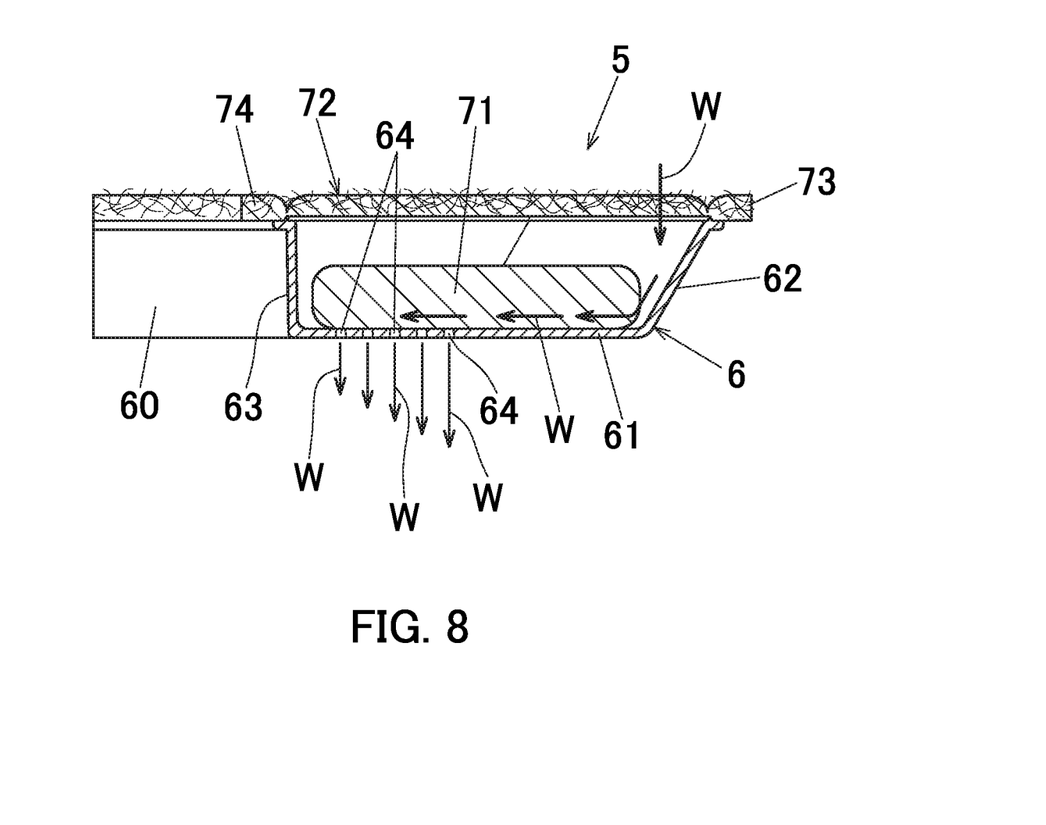
FIG. 8 is an explanatory view for explaining a water flow in the filter of the first embodiment.
Figure 9:
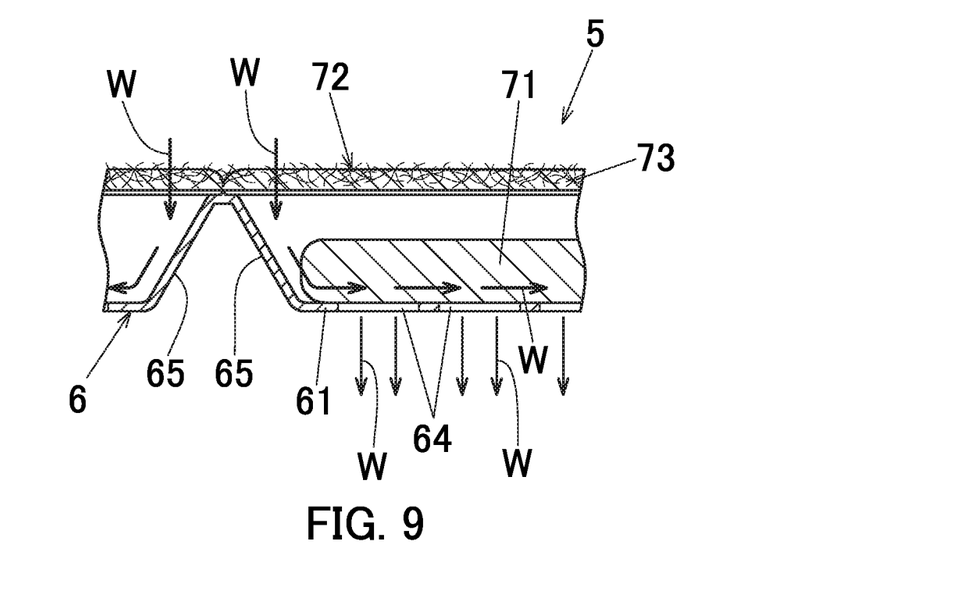
FIG. 9 is an explanatory view for explaining a water flow in the filter of the first embodiment.
Figure 10:
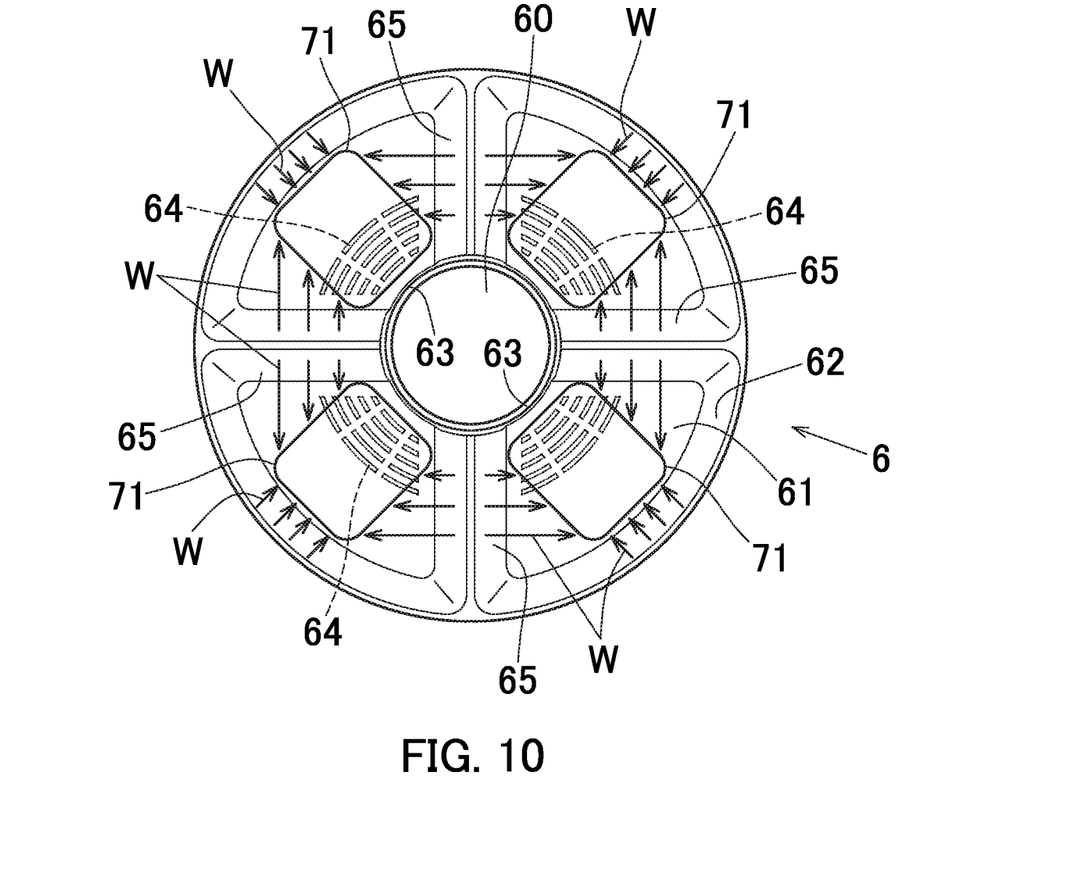
FIG. 10 is an explanatory view for explaining a water flow in the filter of the first embodiment.

In the filter 5 of the first embodiment, as shown in FIG. 8 to FIG. 10, the outer peripheral wall 62 of the filter tray 6 is formed so as to be inclined inwardly downward, and the partition wall 65 is also formed so as to be inclined downward toward the inside as seen from each chamber. Therefore, the water W flowing in from the partition wall 65 and the outer peripheral wall 62 of the filter tray 6 flows down along the inclined surfaces of the partition wall 65 and the outer peripheral wall 62, so that it flows inward with a moderate water force. For this reason, the water W flows toward the center of each chamber. The water passing apertures 64 of the bottom wall 61 exist below the center of each chamber. Thus, the water W assuredly permeates the internal filter medium 71 to be filtered, flows out of the internal filter medium 71 and then returns to the water storage tank 1 through the water passing aperture 64 of the bottom wall 61. As described above, in the first embodiment, the water W flows toward the center of each chamber, which enables to assuredly obtain sufficient filtration performance.

FIGS. 11 to 14 illustrate a circulation type automatic water feeder P2 for pets of a second embodiment of the present invention. The water feeder P2 of this second embodiment is largely different from the circulation type automatic water feeder P1 for pets of the first embodiment in the following point. That is, the circular type automatic water feeder P1 of the first embodiment is of a circular type, whereas the circulation type automatic water feeder P2 for pets of the second embodiment is of a semicircle type.

That is, in the water feeder P2 of the second embodiment, the water storage tank 1 is formed in a substantially semicircular shape in a plan view, and a support frame 2 of a substantially semicircular shape in a plan view is provided at the upper end opening of the water storage tank 1. Further, in the support frame 2, a filter installation recessed step portion 21 of a substantially semicircular shape in a plan view is formed, and a filter 5 of a substantially semicircular or substantially semicircular arc shape in a plan view is accommodated in the recessed step portion 21 thereof.

Figure 12:
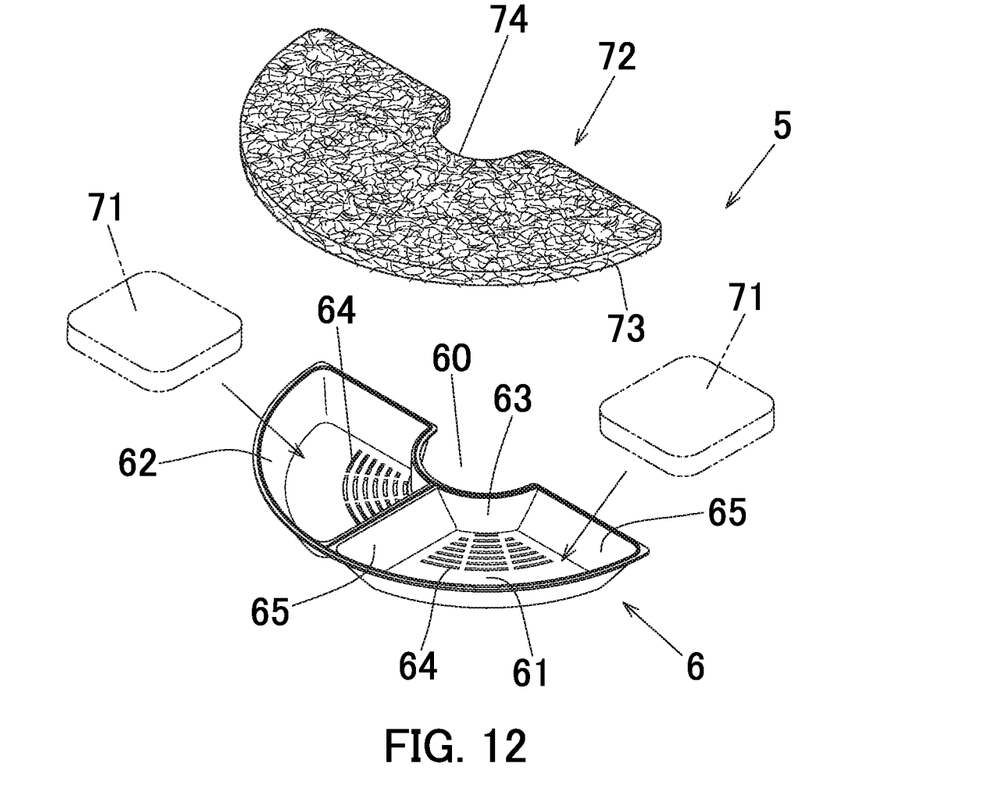
FIG. 12 is an exploded perspective view of a filter applied to a water feeder according to the second embodiment.

In the filter 5, an arcuate inner edge portion 60 corresponding to the center hole 60 of the filter 5 of the first embodiment is formed at a position corresponding to the circular arc center.

In the second embodiment, the arc center side is the inner peripheral edge portion side and the outer circular arc portion is the outer peripheral edge portion side.

Figure 13:
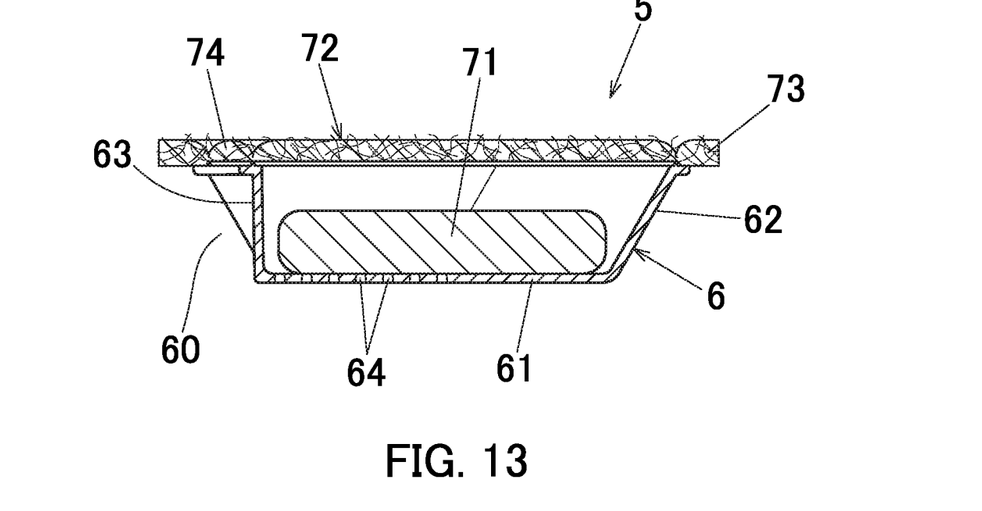
FIG. 13 is a cross-sectional view of the filter of the second embodiment.
Figure 14:
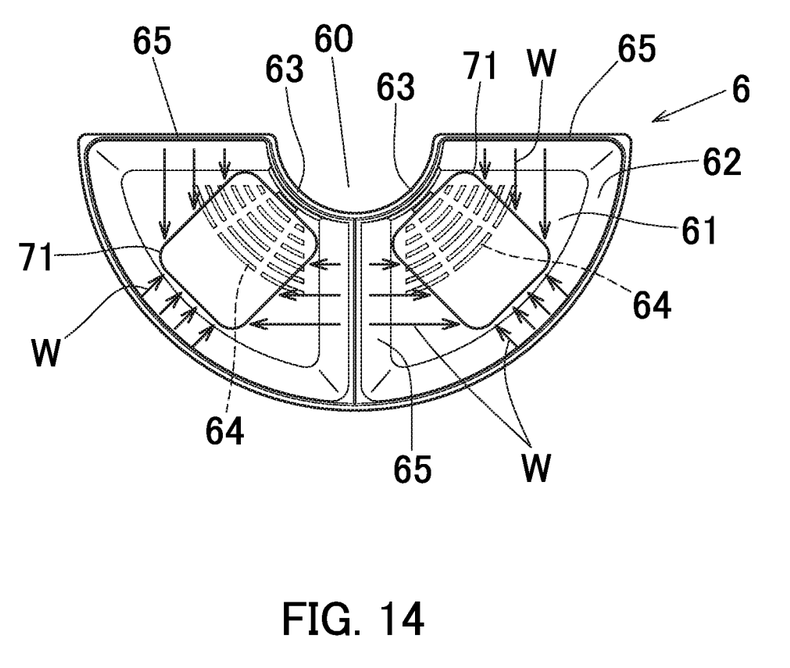
FIG. 14 is an explanatory view for explaining a water flow in the filter of the second embodiment.

The outer peripheral wall 62 of the filter 5 is constituted by an inclined wall inclined downward toward the inner side in the same manner as described above. Similarly to the above, the partition wall 65 is also constituted by an inclined wall inclined inwardly downward toward the inner side as viewed from each chamber.

Figure 11:
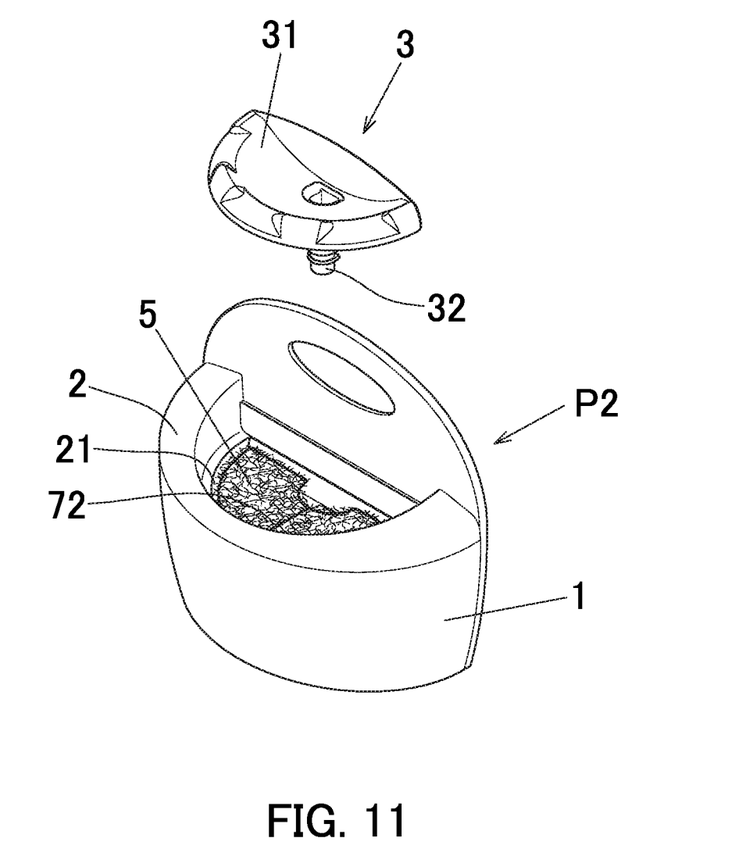
FIG. 11 is a perspective view showing a circulation type automatic water feeder for pets according to a second embodiment of the present invention in a state in which a top funnel is detached.

Further, in the top funnel 3, the water drinking portion 31 is formed in a semicircular shape in a plan view. The lower end of the water supply pipe 32 is supported by the support frame 2 through the arcuate inner edge portion 60 of the filter 5 in the same manner as in the aforementioned embodiment so as to cover the filter 5 by the water drinking portion 31.

Since other configurations of the water feeder P2 for pets of the second embodiment are substantially the same as those of the water feeder P1 of the first embodiment, the same reference numeral is allotted to the same or equivalent part, and the duplicate explanation will be omitted.

Also in the water feeder P2 of the second embodiment, in the same manner as in the first embodiment, the partition wall 65 (as viewed from each chamber) and the outer peripheral wall 62 of the filter tray 6 are inclined. With this, it is possible to flow the water W toward the center of each chamber, which enables to obtain sufficient filtration performance.

Figure 15:
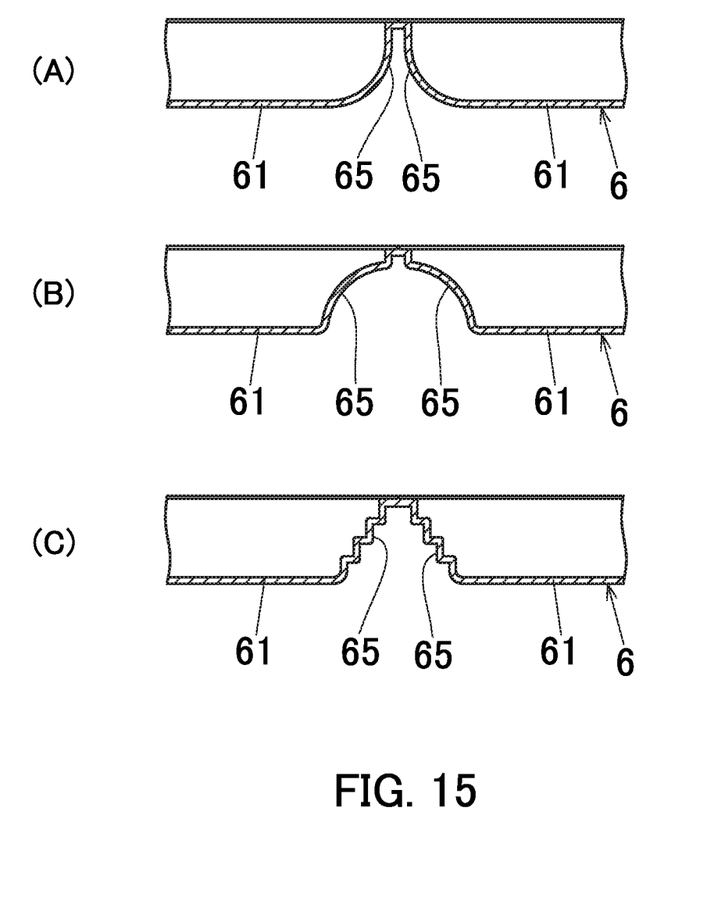
FIG. 15 illustrates filter trays which are modifications of the present invention, wherein (A) is a schematic cross-sectional view of a first modification, (B) is a schematic cross-sectional view of a second modification, and (C) is a schematic cross-sectional view of a third modification.
Figure 16:
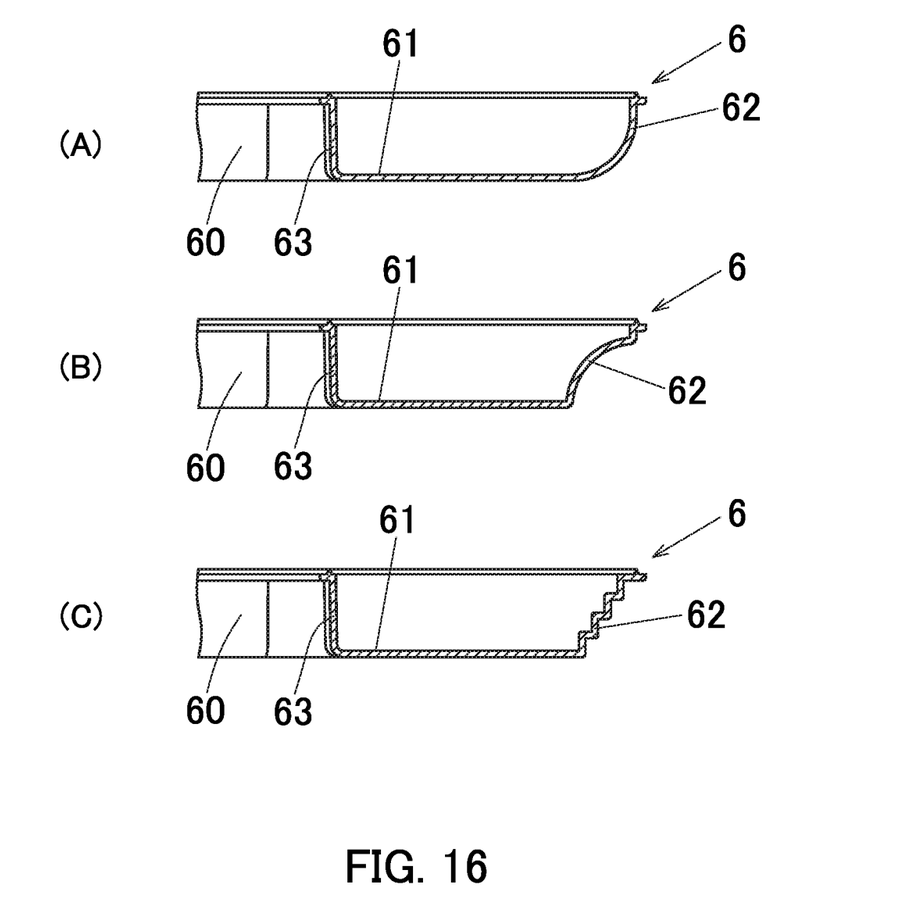
FIG. 16 illustrates filter trays which are modifications of the present invention, wherein (A) is a schematic cross-sectional view of a first modification, (B) is a schematic cross-sectional view of a second modification, and (C) is a schematic cross-sectional view of a third modification.

In the aforementioned embodiment, as shown in FIGS. 15 and 16, the partition wall 65 of the filter tray 6 is constituted by an inclined wall of a constant slope from the upper end to the lower end. In the present invention, however, the gradient of the partition wall 65 of the filter tray 6 may be changed in the middle.

For example, as shown in (A) of FIG. 15, the the partition wall 65 may be formed in an outwardly bulged arcuate cross-sectional shape in which the gradient becomes smaller toward the lower side. Further, as shown in (B) of FIG. 15, the partition wall 65 may be formed in an inwardly bulged arcuate cross-sectional shape in which the gradient becomes larger toward the lower side. Further, in the present invention, as shown in (C) of FIG. 15, the partition wall 65 of the filter tray 6 may be formed stepwise.

In short, it is enough that the partition wall 65 of the filter tray 6 is formed such that the lower side is positioned inner than the upper side as viewed from each chamber. However, in the present invention, in order to flow water smoothly and stably inward, as shown in the first and second embodiments and (A) and (B) of FIG. 15, it is preferable to form the partition wall 65 so as to be inclined downward toward the inside from the upper end to the lower end thereof.

Also, as shown in FIG. 16, the outer peripheral wall 62 may be changed in the same manner as the partition wall 65. That is, as shown in (A) of FIG. 16, the outer peripheral wall 62 may be formed in an outwardly bulged arcuate cross-sectional shape so that the gradient of the outer peripheral wall 62 becomes smaller toward the lower side. As shown in (B) of FIG. 16, the outer peripheral wall 62 may be formed in an inwardly bulged arcuate cross-sectional shape so that the gradient of the outer peripheral wall 62 becomes larger toward the lower side. As shown in (C) of FIG. 16, the partition wall 65 of the filter tray 6 may be formed stepwise. In short, the outer peripheral wall 62 of the filter tray 6 may be formed such that the lower side is positioned inner than the upper side as viewed from each chamber.

In the aforementioned embodiments, a nonwoven fabric is used as the top covering filter medium 72, but not limited thereto. In the present invention, as the top covering filter medium, any physical filter medium other than a nonwoven fabric, such as, e.g., a sponge, may be used.

In the aforementioned embodiments, activated carbon is used as the internal filter medium 71, but not limited thereto. In the present invention, as the internal filter medium, an adsorption filter medium or a chemical filter medium, such as, e.g., zeolite, other than activated carbon may be used.

The present application claims priority to Japanese Patent Application No. 2017-097521 filed on May 16, 2017, the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention. The present invention allows any design changes unless departing from its spirit within the scope of the claims.

INDUSTRIAL APPLICABILITY

The water feeder for pets according to the present invention can be used as a feeder for feeding drinking water for pets, such as, e.g., dogs and cats.

DESCRIPTION OF REFERENCE SYMBOLS

1: water storage tank
31: water drinking portion
5: filter
6: filter tray
61: bottom wall
62: outer peripheral wall
64: water passing aperture
65: partition wall
71: internal filter medium
72: top covering filter medium
73: outer peripheral edge portion
P1, P2: circulation type automatic water feeder for pets
W: water

The invention claimed is:

1. A filter for a water feeder for pets, wherein the water feeder includes a water storage tank and a water drinking portion arranged above the water storage tank and is configured to supply water from the water storage tank to the water drinking portion and return the water to the water storage tank, and the filter is detachably provided between the water storage tank and the water drinking portion to pass the water returning from the water drinking portion to the water storage tank from an upper surface side of the filter to an lower surface side thereof, the filter comprising:
a filter tray including a bottom wall having a water passing aperture formed therein, an outer peripheral wall provided at an outer peripheral edge portion of the bottom wall in a rising manner, an inner peripheral wall provided at an inner peripheral edge portion in a rising manner, and a plurality of partition walls partitioning a space between the outer peripheral wall and the inner peripheral wall into a plurality of internal filtration chambers in a circumferential direction,
an internal filter medium accommodated in the filter tray, and
a top covering filter medium attached so as to cover an upper end opening of the filter tray, wherein
the outer peripheral wall of the filter tray is formed so that a lower side of the outer peripheral wall is positioned inner than an upper side thereof, and
the partition wall of the filter tray is formed so that a lower side of the partition wall is positioned inner than an upper side thereof when viewed from each chamber.

2. The filter for a water feeder for pets as recited in claim 1,
wherein the partition wall of the filter tray is formed so as to be inclined downward toward an inside from an upper end of the partition wall to a lower end thereof when viewed from each chamber.

3. The filter for a water feeder for pets as recited in claim 1,
wherein the outer peripheral wall of the filter tray is formed so as to be inclined downward toward an inside from an upper end of the outer peripheral wall to a lower end thereof.

4. The filter for a water feeder for pets as recited in claim 1,
wherein the partition wall of the filter tray is composed of two plates.

5. The filter for a water feeder for pets as recited in claim 1,
wherein the filter is formed into a donut shape in a plan view.

6. The filter for a water feeder for pets as recited in claim 1,
wherein the filter is formed in a semicircular arc shape in a plan view.

7. A water feeder for pets, comprising:
a water storage tank;
a filter detachably provided above the water storage tank; and
a water drinking portion provided above the filter,
wherein the water feeder is configured to pass the water supplied from the water storage tank to the water drinking portion through the filter from an upper surface side of the filter to a lower surface side thereof to return to the water storage tank,
the filter comprising:
a filter tray including a bottom wall having a water passing aperture formed therein, an outer peripheral wall provided at an outer peripheral edge portion of the bottom wall in a rising manner, an inner peripheral wall provided at an inner peripheral edge portion in a rising manner, and a plurality of partition walls partitioning a space between the outer peripheral wall and the inner peripheral wall into a plurality of internal filtration chambers in a circumferential direction,
an internal filter medium accommodated in the filter tray, and
a top covering filter medium attached so as to cover an upper end opening of the filter tray, wherein
the outer peripheral wall of the filter tray is formed so that a lower side of the outer peripheral wall is positioned inner than an upper side thereof, and
the partition wall of the filter tray is formed so that a lower side of the partition wall is positioned inner than an upper side thereof when viewed from each chamber.

* * * * *